(12) United States Patent
Lee (10) Patent No.: US 7,460,323 B2
(45) Date of Patent: Dec. 2, 2008

(54) METHODS AND SYSTEMS FOR AUTOMATICALLY CHARACTERIZING NON-LINEARITIES OF A READ-BACK SIGNAL OF A RECORDING SYSTEM

(75) Inventor: Yuan Xing Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 283 days.

(21) Appl. No.: 11/495,007

(22) Filed: Jul. 27, 2006

(65) Prior Publication Data
US 2007/0041115 A1 Feb. 22, 2007

Related U.S. Application Data

(60) Provisional application No. 60/703,665, filed on Jul. 29, 2005.

(51) Int. Cl.
G11B 5/09 (2006.01)
(52) U.S. Cl. .............................. 360/39; 360/31; 360/53
(58) Field of Classification Search ....................... None
See application file for complete search history.

(56) References Cited

U.S. PATENT DOCUMENTS

| 5,262,904 | A | | 11/1993 | Tang et al. |
| 5,493,454 | A | * | 2/1996 | Ziperovich et al. ............ 360/45 |
| 6,208,477 | B1 | | 3/2001 | Cloke et al. |
| 6,636,372 | B1 | | 10/2003 | Nguyen et al. |
| 6,741,412 | B2 | | 5/2004 | Sawaguchi et al. |
| 7,170,704 | B2 | * | 1/2007 | DeGroat et al. ............... 360/53 |
| 2004/0190172 | A1 | | 9/2004 | Sawaguchi et al. |
| 2007/0047120 | A1 | * | 3/2007 | DeGroat ...................... 360/39 |

OTHER PUBLICATIONS

Palmer et al, Identification of Nonlinear Write Effects Using Pseudorandom Sequences, Sep. 1987, IEEE Transactions on Magnetics, vol. Mag-23, No. 5, pp. 2377-2379.*
Ozgunes et al, Synchronization-Free Dibit Response Extraction from PRBS Waveforms, Sep. 2003, IEEE Transactions on Magnetics, vol. 39, No. 5, pp. 2225-2227.*

* cited by examiner

*Primary Examiner*—Andrea Wellington
*Assistant Examiner*—Dan I Davidson (57) ABSTRACT

A method for automatically characterizing non-linearities of a perpendicular read-back signal of a recording system is disclosed. The method includes using dibit extraction to obtain a read-back signal having a main pulse and a plurality of echoes where the read-back signal exhibits a baseline shift. An area under the first echo is integrated to obtain a first area where the integrating subtracts any baseline shift area within the first echo and where the first echo is associated with a first non-linearity. The method integrates an area of the read-back signal under the main pulse to obtain a second area where the integrating subtracts any baseline shift area within the main pulse. A first parameter is computed that characterizes the first non-linearity based on the first area and the second area. The method may be applied to characterize several non-linearities.

25 Claims, 11 Drawing Sheets

POLYNOMIAL $\chi^7 + \chi^3 + \chi^2 + \chi + 1$

Table Non-linearities and The Locations of the Echoes
(assume write NRZ pattern can be inverted, but the read NRZ pattern is fixed in polarity)

| Echoes 601 | Locations 603 | NRZ Bit Product 605 | Comments 606 |
|---|---|---|---|
| Main Pulse | 0 | $a_k$ | Inverts with write NRZ pattern |
| OW (hard/easy shift) | 40.5 | $a_k a_{k-1}$ | Inverts with DC erase polarity, not inverts with write or read NRZ pattern |
| 1st NLTS | 31.5 | $a_k a_{k-1} a_{k-2}$ | Inverts with write NRZ pattern |
| 2nd NLTS | 14.5 | $a_k a_{k-1} a_{k-3}$ | Inverts with write NRZ pattern |
| Head Asymmetry | 40.5<br>-46<br>-55.5<br>35 | $a_k a_{k-1}$<br>$a_k a_{k-2}$<br>$a_k a_{k-3}$<br>$a_k a_{k-4}$ | Not inverts with write or read NRZ pattern |
| Head Saturation | 31<br>14<br>-22<br>62<br>56<br>7 | $a_k a_{k-1} a_{k-2}$<br>$a_k a_{k-1} a_{k-3}$<br>$a_k a_{k-2} a_{k-3}$<br>$a_k a_{k-2} a_{k-4}$<br>$a_k a_{k-1} a_{k-4}$<br>$a_k a_{k-3} a_{k-4}$ | Inverts with write or read NRZ pattern |

FIGURE 6A

- Method 1: (Based on Peak of echoes) 2* Amp (40.5)/Amp (0) = 2* 0.13 = 0.26
- Method 2: (Based on area integration) 2* sum (Area (40.5)/Area (0)) = 2* 1985/2.2081 = 0.18, with a window of 5 samples
- Method 3: (modified Method 2) 2* sum (Area (40.5)/Area (0)) = 2* 0.2211/2.2081 = 0.2, with a window of 5 samples, and subtraction of base-line shift in extracted dibit

FIGURE 6B

- Method 1: 2* Amp (40.5)/Amp (0) = 2* 0.13 = 0.26
- Method 2: 2* sum (Area (40.5)/Area (0)) = -0.26, with a window of 5 samples
- Method 3: 2* sum (Area (40.5)/Area (0)) = -0.194, with a window of 5 samples, and subtraction of DC offset in extracted dibit

FIGURE 7

METHODS AND SYSTEMS FOR AUTOMATICALLY CHARACTERIZING NON-LINEARITIES OF A READ-BACK SIGNAL OF A RECORDING SYSTEM

RELATED U.S. APPLICATIONS

This application claims priority to co-pending provisional application Ser. No. 60/703,665 filed on Jul. 29, 2005, which is hereby incorporated by reference to this specification.

TECHNICAL FIELD

Embodiments of the invention pertain to methods and systems for automatically characterizing non-linearities of a read-back signal of a recording system. More specifically, embodiments of the invention pertain to perpendicular read-back signals.

BACKGROUND ART

Data storage is an important function of the computer systems that are employed by businesses, universities, individual computer users, etc. Data storage systems enable the storage of vast amounts of information that can be used in a variety of ways. Computer data storage involves the use of magnetic and/or optical devices to store information. A component of many computer data storage systems is a disk drive. A disk drive is an assembly that is designed to store and retrieve information through the use of spinning magnetic media and an actuating magnetic transducer (read/write head).

A read/write head is the electromagnetic component in a disk drive (or tape drive) that reads and records data on a magnetic surface. Read/write heads can employ read-back signals, which carry data that is read from a disk, that have either longitudinal or perpendicular orientations. The use of read/write heads that are employed in perpendicular recording has increased as recording technology has developed. Read-back signals routinely exhibit noise in the form of various types of non-linear distortions that can detrimentally affect the performance and storage capacity of a recording device. Non-linear distortion types may include over write (OW), MR asymmetry (MR ASYM), and non-linear transition shift (NLTS), and others.

The capacity to accurately characterize non-linear distortions that are exhibited by the read-back signals of a read/write head of a recording device is critical to effective analysis of their performance. The accurate characterization of non-linear distortion enables the elimination or diminution of the distortion that is exhibited by the signals through the use of basic signal processing techniques.

Conventional systems that are used to characterize non-linear distortions are designed to characterize the non-linear distortions that are exhibited by longitudinal signals. It should be appreciated that longitudinal signals contain no direct current (DC) components. However, perpendicular signals that are increasingly being employed in read/write heads do contain DC components. Because many conventional non-linear distortion characterization systems are not designed to manage signals that contain DC components, these conventional systems are ineffective for characterizing the non-linear distortions of perpendicular signals. There typically exists high-pass filter in signal read-back path to the input of a read channel. The high-pass filter (AC coupling) eliminates DC components in read-back signal causing base-line of read-back signal to shift. The conventional non-linear distortion characterization systems become ineffective when read-back signals have base-line shift. Further, effective characterization of these non-linear distortions is crucial in reducing their signal contributions for accurate data recovery processing of the perpendicular read-back signal.

SUMMARY OF THE INVENTION

Accordingly, a need exists for an effective means of characterizing non-linearities of perpendicular read-back signals of recording systems. The present invention provides a system that addresses the above-mentioned need. In one embodiment, a dibit extraction is applied to a read-back signal to obtain a main pulse and several echoes of interest. Each echo corresponds to a different non-linearity. The read-back signal is a perpendicular signal and is characterized as having a base line offset, e.g., a DC component. Parameters characterizing the non-linearities are computed as follows. The areas under each echo are computed and the contribution of the area under the base-line shift is subtracted out to obtain the final area values under each echo. Therefore, the portion under the base-line shift for each echo is subtracted out of its area computation. The area under the main pulse is also computed in this fashion accounting for (subtracting) the portion under the base-line. Using these area values, a parameter accurately characterizing each non-linearity may be computed.

More specifically, in one embodiment, a method of automatically characterizing non-linearities of a read-back signal of a recording system is described. The method uses dibit extraction to obtain a read-back signal having a main pulse and a plurality of echoes and wherein said read-back signal comprises a baseline shift. The method continues by: (1) integrating an area of said read-back signal under a first echo of interest to obtain a first area wherein said integrating subtracts any baseline shift area within said first echo and wherein said first echo is associated with a first non-linearity; (2) integrating an area of said read-back signal under a second echo of interest to obtain a second area wherein said integrating subtracts any baseline shift area within said second echo and wherein said second echo is associated with a second non-linearity; (3) integrating an area of said read-back signal under a third echo of interest to obtain a third area wherein said integrating subtracts any baseline shift area within said third echo and wherein said third echo is associated with a third non-linearity; and (4) integrating an area of said read-back signal under said main pulse to obtain an area and wherein said integrating subtracts any baseline shift area within said main pulse.

Based on said first, second, and third areas and said area under said main pulse, parameters characterizing said first, second, and third non-linearities are computed. The non-linearities characterized may be MR ASYM, OW and/or NLTS non-linearities, for instance. In one embodiment, the parameters are computed by twice a value of said first, second or third area divided by said area of said main pulse.

In one embodiment, a method for automatically characterizing non-linearities of a read-back signal of a recording system is disclosed. The method includes using dibit extraction to obtain a read-back signal having a main pulse and a plurality of echoes where the read-back signal exhibits a baseline shift, integrating an area of the read-back signal under a first echo to obtain a first area where the integrating accounts for any baseline shift area within the first echo and where the first echo is associated with a first non-linearity, and, integrating an area of the read-back signal under the main pulse to obtain a second area where the integrating accounts for any baseline shift area within the main pulse. A first parameter is computed that characterizes the first non-linearity based on the first area and the second area.

These and other advantages of the present invention will no doubt become obvious to those of ordinary skill in the art after having read the following detailed description of the preferred embodiments which are illustrated in the drawing figures.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

System for Automatically Characterizing
Non-Linearities of a Recording System

Figure 1:
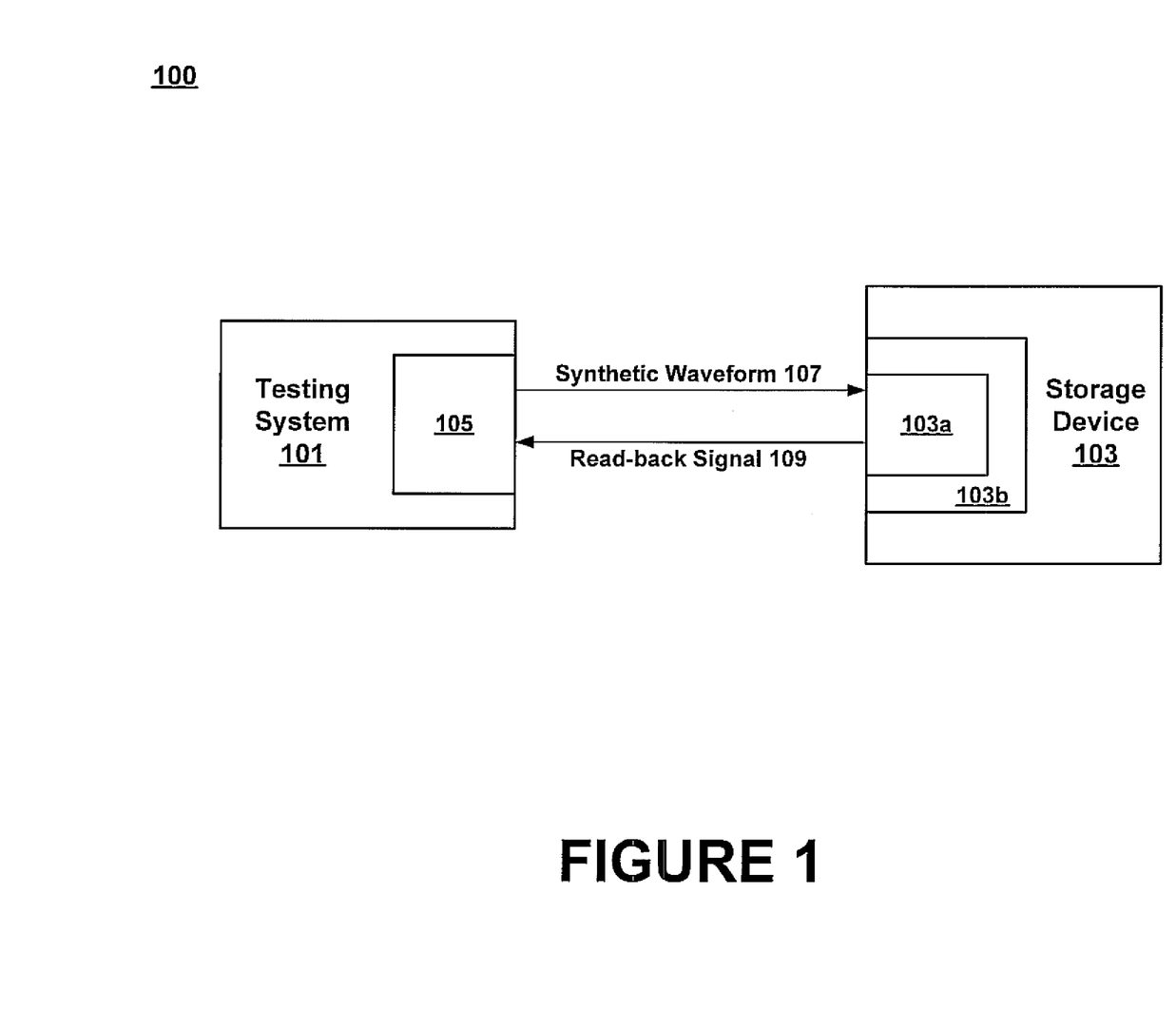
FIG. 1 shows a testing system and a disk drive wherein the disk drive includes a recording head and a recording medium and wherein the testing system includes a system for automatically characterizing non-linearities of a read-back signal of a recording head according to one embodiment of the present invention.

FIG. 1 shows a testing system 101 and a data storage device wherein the data storage device includes a recording head 103a and a recording medium 103b and wherein the testing system 101 includes a system 105 for automatically characterizing non-linearities of a read-back signal of a recording system according to one embodiment of the present invention. In one embodiment, testing system 101 generates a special write current waveform that is placed onto a recording medium and obtains a read-back signal from a recording system whose non-linearities are automatically characterized using an algorithm. The read-back signal may be a perpendicular read-back signal. In exemplary, embodiments, a baseline shift in the read-back signal due to alternate current (AC) coupling and existence of direct current (DC) signal components are accounted for in the characterization of the non-linearities. FIG. 1 shows testing system 101, storage device 103, recording head 103a, recording medium 103b and system 105 for automatically characterizing non-linearities of a read-back signal. Also shown in FIG. 1 is write current waveform 107 and read-back signal 109.

Referring to FIG. 1, testing system 101 (e.g., HGST channel) is used to test for non-linearities in a read-back signal. As mentioned above, testing system 101 generates a special write current waveform 107 (e.g., a pseudo-random binary sequence [PRBS] of bits) that is written onto recording medium 103b. Well known dibit extraction processes may be used. The non-linearities present in the corresponding read-back signal 109 that is read from the recording medium 103a is then characterized by system 105 for automatically characterizing non-linearities in a recording system. In one embodiment, the PRBS waveform may be created to satisfy the polynomial constraints of a polynomial such as, but not limited to, the one given below:

$$X^7+X^3+X^2+X+1 \tag{1}$$

It is understood that any primitive polynomial may be used to generate the PRBS waveform depending on the choice of individual system users. However a different polynomial results in different correspondences between echoes and their corresponding non-linearities.

In other embodiments, other techniques for creating an appropriate PRBS waveform 107 may be employed. In one embodiment, the PRBS waveform 107 may be coupled as an input to recording head 103a of data storage device 103. Testing system 101 may be coupled to obtain a read-back signal 109 via read/write head from which non-linearities may be characterized.

Figure 6A:
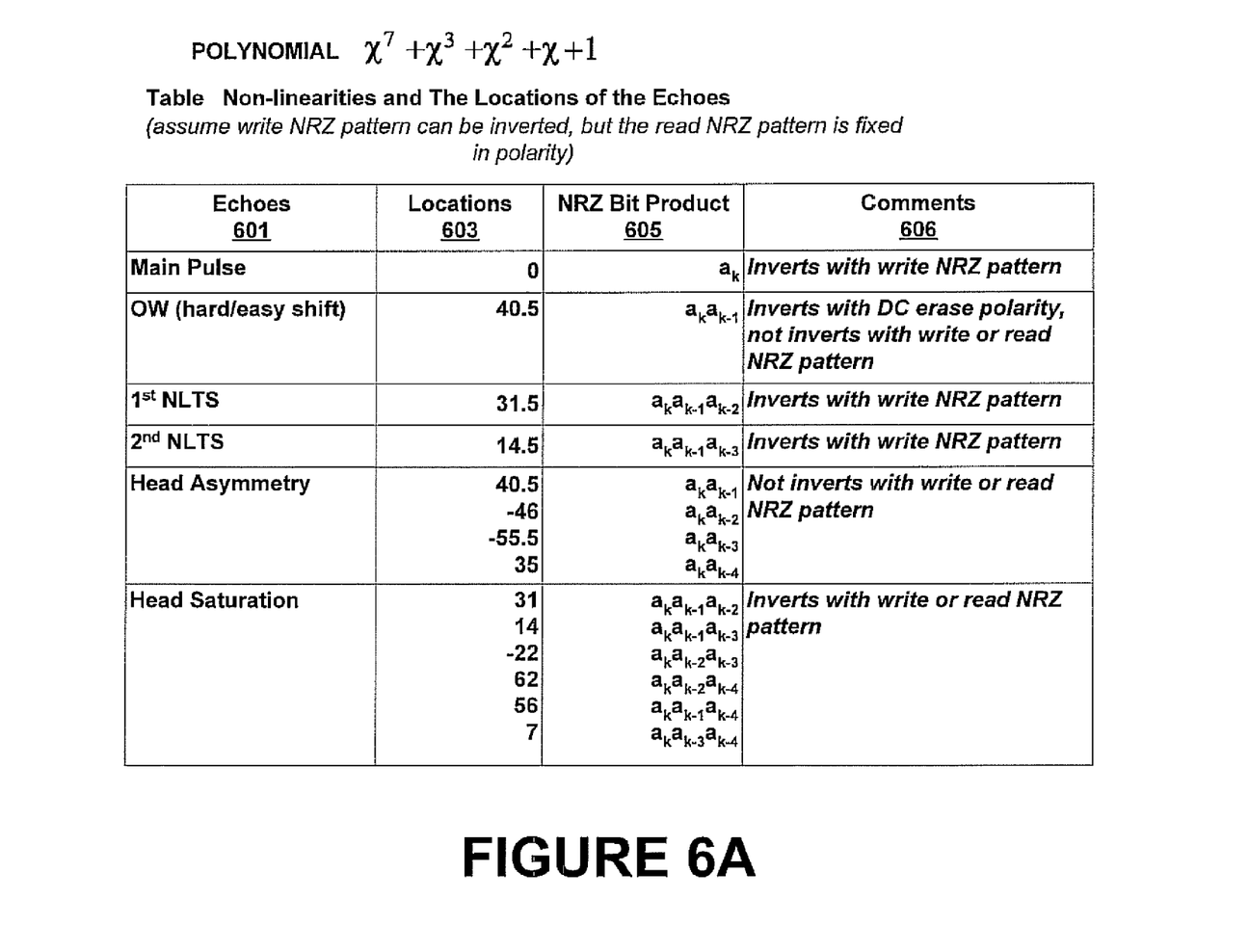
FIG. 6A shows a table that describes non-linearities and the location of echoes in a read-back signal.

Using the PRBS waveform 107 satisfying the above relationship, the read-back signal 109 may exhibit non-linearities at known positions according to FIG. 6A. Column 601 indicates the type of non-linearity and column 603 indicates the corresponding echo location for the polynomial illustrated.

In one embodiment, system 105 for automatically characterizing non-linearities of a read-back signal of a recording system (e.g., storage device 103) that is obtained after a PRBS waveform 107 is written onto and read-back from recording medium 103b. In one embodiment, system 105 uses an algorithm that characterizes the non-linearities present in obtained read-back signal 109 and importantly accounts for (e.g., subtracts) any baseline shift in the read-back signal that may be due to AC coupling and existence of DC components of read-back signal 109.

As discussed more fully below, the characterization process computes areas under the echoes of the read-back signal where the echoes are located according to the locations of FIG. 6A with the illustrative polynomial. Each echo corresponds to a different non-linearity. The area of the main pulse is also computed. Within these area computations, any contribution under the base-line shift is subtracted out of the final area result. The areas are then used to produce a parameter for each non-linearity.

Operation

In operation, testing system 101 generates a PRBS waveform 107 that is written onto recording medium 103b via recording head 103a. Read-back signal 109 is obtained by testing system 101 via recording head 103a. System 105 for automatically characterizing non-linearities in a read-back signal of a recording system accesses read-back signal 109 and characterizes the non-linearities present in obtained read-back signal 109 and accounts for any baseline shift in the read-back signal that may be due to AC coupling and existence of DC components of read-back signal 109.

Figure 2:
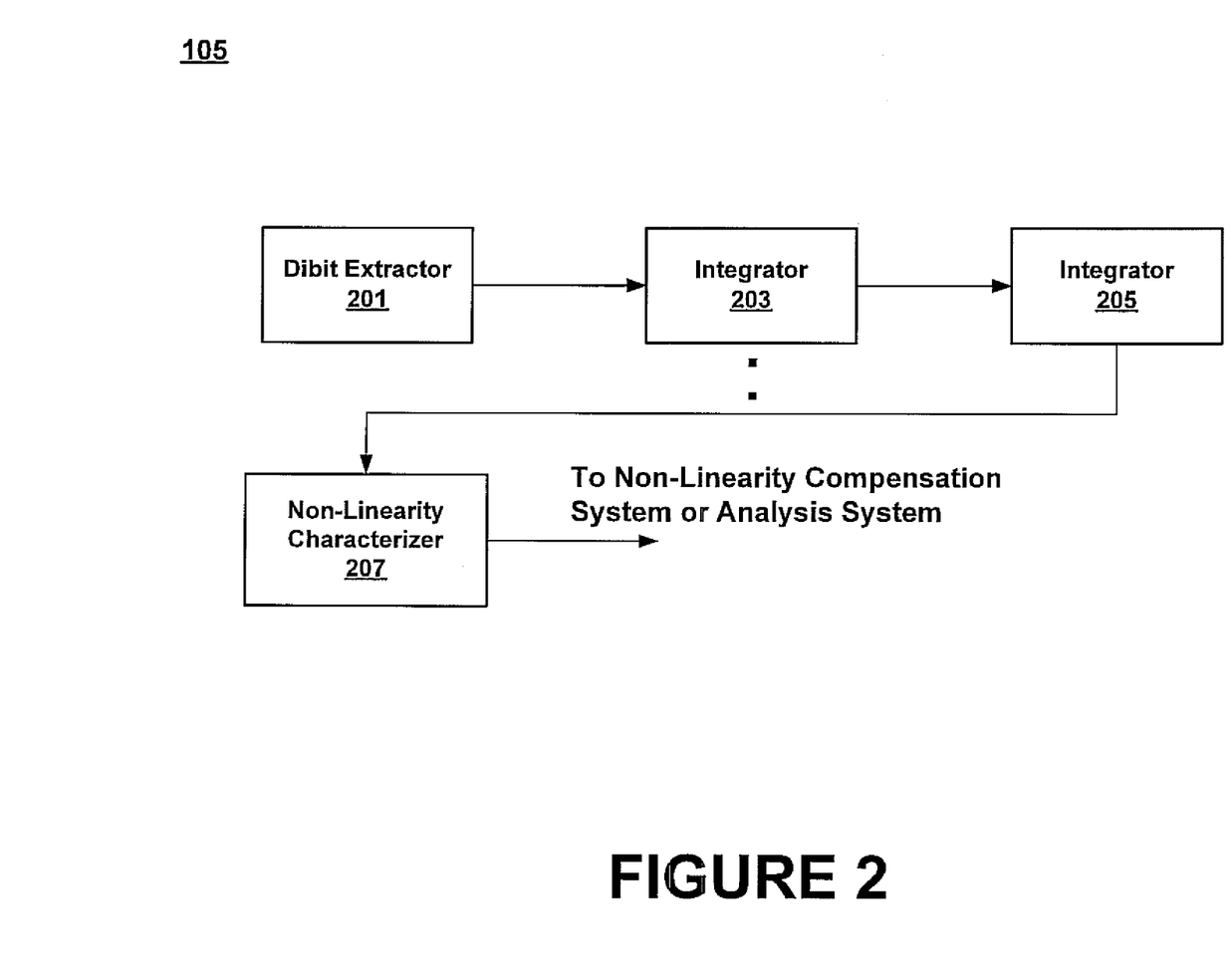
FIG. 2 shows a system for automatically characterizing the non-linearities of a read-back signal of a recording system according to one embodiment of the present invention.

FIG. 2 shows a system 105 for automatically characterizing the non-linearities of a read-back signal of a recording system according to one embodiment of the present invention. In one embodiment, system 105 for automatically characterizing the non-linearities of a read-back signal of a recording system accounts for baseline shifts due to AC coupling and existence of DC components in its characterization of the non-linearities of recording systems' read-back signals.

It should be appreciated that system 105 may effectively characterize either longitudinal or perpendicular signals. In the FIG. 2 embodiment, system 105 includes dibit extractor 201, integrator 203, integrator 205 and non-linearity characterizer 207.

Referring to FIG. 2, dibit extractor 201 obtains a read-back signal that includes a main pulse and a plurality of echoes using dibit extraction. In one embodiment, the read-back signal may exhibit a shift of its baseline. In one embodiment, the baseline shift that the read-back signal may exhibit may be due to AC coupling and existence of (DC) direct current offset.

Integrator 203 determines an area of the read-back signal under a first echo through the integration of the read-back signal over the length of the echo. In one embodiment, the determination of the area of the read-back signal under the first echo accounts for any baseline shift area that exists within the first echo. In one embodiment, the first echo is associated with a first non-linearity. Integrator 203 may be replicated for other non-linearities. In other words, if multiple echoes of the read-back signals are to be characterized, then a separate integrator 203 may be added to compute the area for each other echo separately. When multiple integrators 203 are added, system 105 may compute parameters for multiple non-linearities.

Integrator 205 determines an area of the read-back signal under the main pulse by integrating the read-back signal over the length of the main pulse to obtain a second area. In one embodiment, the integration accounts for (e.g., subtracts) any baseline shift area that exists within the main pulse.

Non-linearity characterizer 207 computes a value of a first parameter that characterizes the first non-linearity based on the determined first and second areas. In one embodiment, a computation the value of the first parameter may be performed using the following equation:

$$\text{Non-linearity Parameter Value}=2*\text{Area(echo)}/\text{Area(mainPulse)} \quad (3)$$

The characterizer 207 will perform the above computation for each echo area produced by each integrator 203. If multiple echos (echo(i)) are being characterized, the equation can be generalized according to:

$$\text{Non-linearity Parameter Value}(i)=2*\text{Area(echo}(i))/\text{Area(mainPulse)} \quad (4)$$

In one embodiment, the values that are computed may be provided to an analysis system and/or to a non-linearity compensation system. In one embodiment, various types of compensation may be employed may include but are not limited to compensation for over write (OW), asymmetry (MR ASYM), and non-linear transition shift (NLTS) and any other type of non-linearity of interest.

In one embodiment, system 105 for characterizing non-linearities of a read-back signal of a recording system may be implemented in software. In another embodiment, system 105 for characterizing non-linearities of a read-back signal of a recording system may be implemented in hardware. In yet another embodiment, system 105 for characterizing non-linearities of a read-back signal of a recording system may be implemented in a combination of software and hardware.

Figure 3A:
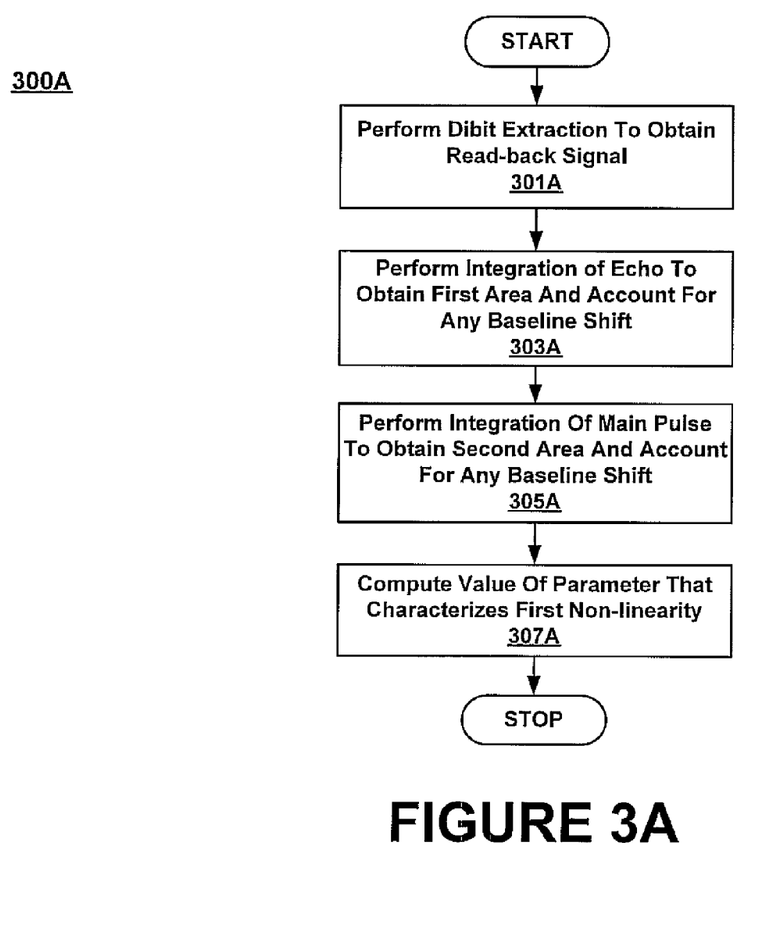
FIG. 3A is a flowchart of the steps performed in a method for automatically characterizing a non-linearity of a read-back signal of a recording system according to one embodiment of the present invention.
Figure 3B:
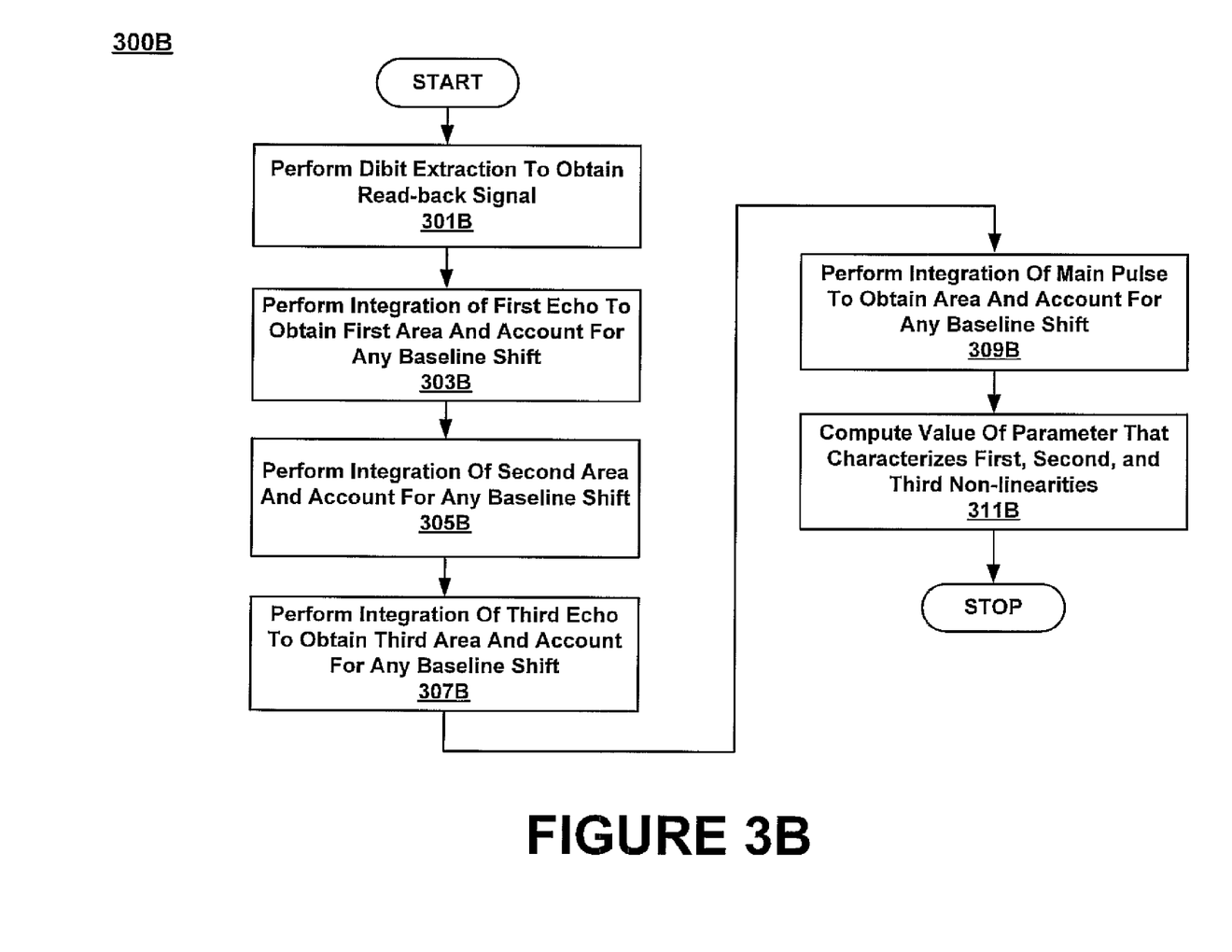
FIG. 3B is a flowchart of the steps performed in a method for automatically characterizing multiple non-linearities of a read-back signal of a recording system according to one embodiment of the present invention.

FIG. 3A is a flowchart of the steps performed in a method for automatically characterizing a non-linearity of a read-back signal of a recording system according to one embodiment of the present invention. FIG. 3B illustrates the method for multiple non-linearities. The method of FIG. 3A constitutes a process for characterizing a non-linearity of a read-back signal of a recording system that will be referred to in FIGS. 4 and 5.

Referring to FIG. 3A, at step 301, dibit extraction is used to obtain a read-back signal having a main pulse and a plurality of echoes. In one embodiment, the read-back signal includes a baseline shift.

At step 303A, an area of the read-back signal under a first echo is determined using integration to obtain a first area. In one embodiment, the integration accounts for any baseline shift area within the first echo and wherein the first echo is associated with a first non-linearity.

At step 305A, an area of the read-back signal under the main pulse is determined using integration to obtain a second area. In one embodiment, the integration accounts for any baseline shift area within the main pulse.

At step 307A, a value of a first parameter is computed characterizing the first non-linearity based on the first area and the second area. In one embodiment, the value that is computed may be provided to an analysis system and/or to a non-linearity compensation system. In one embodiment, various types of compensation may be employed may include but are not limited to compensation for over write (OW), MR ASYM, and NLTS.

FIG. 3B is a flowchart of the steps performed in a method for automatically characterizing multiple non-linearities of a read-back signal of a recording system according to one embodiment of the present invention.

Referring to FIG. 3B, at step 301B, dibit extraction is used to obtain a read-back signal having a main pulse and a plurality of echoes. In one embodiment, the read-back signal includes a baseline shift.

At step 303B, an area of the read-back signal under a first echo is determined using integration to obtain a first area. In one embodiment, the integration accounts for any baseline shift area within the first echo and wherein the first echo is associated with a first non-linearity.

At step 305B, an area of the read-back signal under a second echo of interest is integrated to obtain a second area. In one embodiment, the integrating accounts for any baseline shift area within the second echo and the second echo is associated with a second non-linearity.

At step 307B, an area of the read-back signal under a third echo of interest is integrated to obtain a third area. In one embodiment, the integrating accounts for any baseline shift area within the third echo and the third echo is associated with a third non-linearity;

At step 309B, an area of the read-back signal under the main pulse is determined using integration to obtain an area. In one embodiment, the integration accounts for any baseline shift area within the main pulse.

At step 311B, first, second and third non-linearities are characterized based on the first, second and third areas and the area under the main pulse. In one embodiment, values characterizing the non-linearities may be computed that may be provided to an analysis system and/or to a non-linearity compensation system. In one embodiment, various types of compensation may be employed and may include but are not limited to compensation for over write (OW), MR ASYM, and NLTS.

Figure 4:
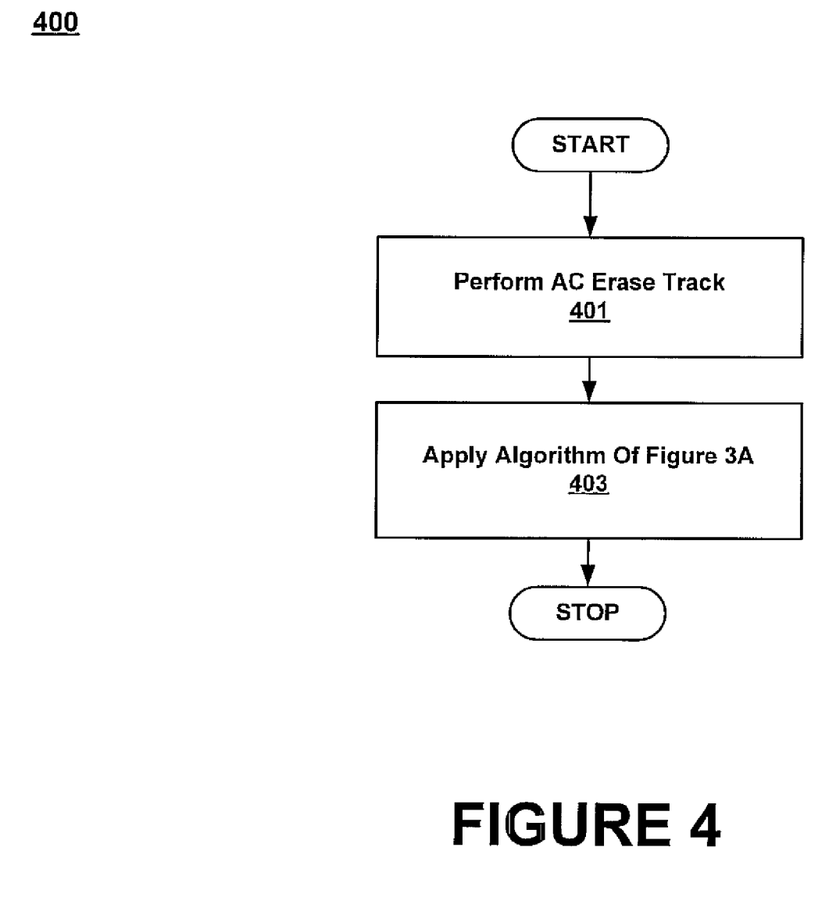
FIG. 4 is a flowchart of the steps performed in a method for automatically characterizing MR SYM non-linearities of a read-back signal of a recording system according to one embodiment of the present invention.

FIG. 4 is a flowchart 400 of the steps performed in a method for automatically characterizing MR SYM non-linearities of a read-back signal of a recording system according to one embodiment of the present invention. It should be appreciated that FIG. 4 illustrates a method that may be employed to effectively characterize MR SYM. Referring to FIG. 4, at step 401, an alternating current (AC) erase track is performed. And, at step 401, the algorithm of FIG. 3 is applied to provide a value of a parameter that characterizes the MR SYM non-linearity. In one embodiment, the value that is computed may be provided to a signal analysis system and/or to a system that may provide compensation for the MR SYM non-linearity.

Figure 5:
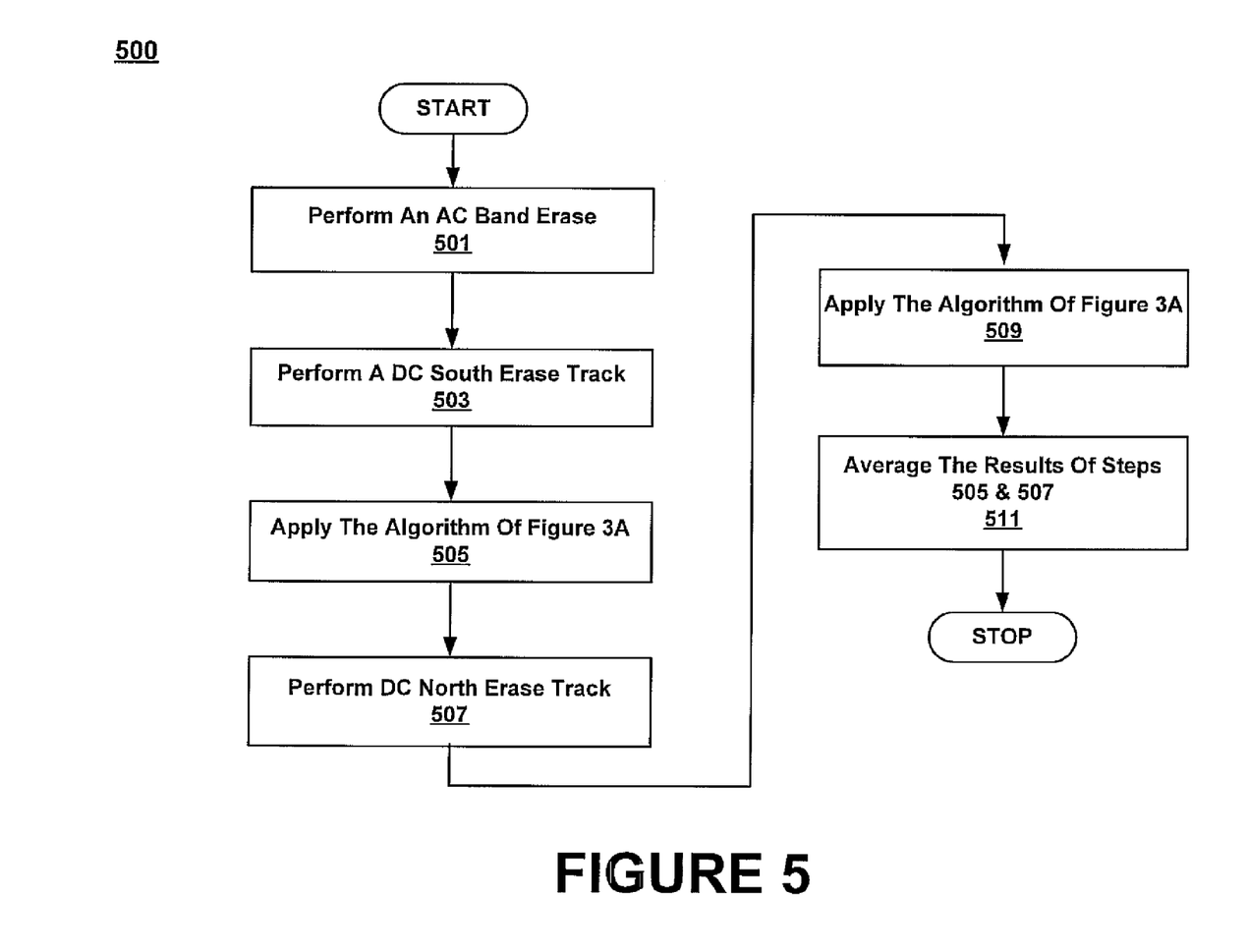
FIG. 5 is a flowchart of the steps performed in a method for automatically characterizing over write (OW) non-linearities of a read-back signal of a recording system according to one embodiment of the present invention.

FIG. 5 is a flowchart 500 of the steps performed in a method for automatically characterizing over write (OW) non-linearities of a read-back signal of a recording system according to one embodiment of the present invention. FIG. 4 illustrates a method that may be employed to effectively characterize OW non-linearities. Referring to FIG. 5, at step 501, an AC band erase is performed. Subsequently, at step 503, a DC south erase track is performed.

At step 505, the algorithm of FIG. 4 is initially applied. Subsequently, at step 507, a DC north erase track is performed. Then at step 509, the algorithm of FIG. 4 is again applied. At step 509, the results of steps 505 and 509 are averaged to provide a value of a parameter that characterizes the OW non-linearity. In one embodiment, the value that is computed may be provided to an analysis system and/or to a system that may provide compensation for OW non-linearities.

FIG. 6A shows a table that describes non-linearities and the location of echoes in a read-back signal corresponding to PRBS waveform satisfying the constraints of polynomial (1) that was discussed above. It is understood that polynomial (1) is only presented for illustrative purpose, and is not the only applicable polynomial. Any primitive polynomial may be used. It is at the discretion of individual system users. Different polynomials result in different tables of location and non-linearity echoes. FIG. 6 describes echoes 601, locations 603, NRZ bit product 605 and comments 606. Echoes listed in the table of FIG. 6A include main pulse, OW, 1rst NLTS, $2^{nd}$ NLTS, Head Asymetry, and Head Saturation. The table of FIG. 6 lists the location 603, the NRZ bit product 605, and comments 607 related to characteristics of each of the various types of echoes that are present in a read-back signal that corresponds to the PRBS waveform satisfying the constraints of polynomial (1) discussed herein and reproduced in FIG. 6A.

Figure 6B:
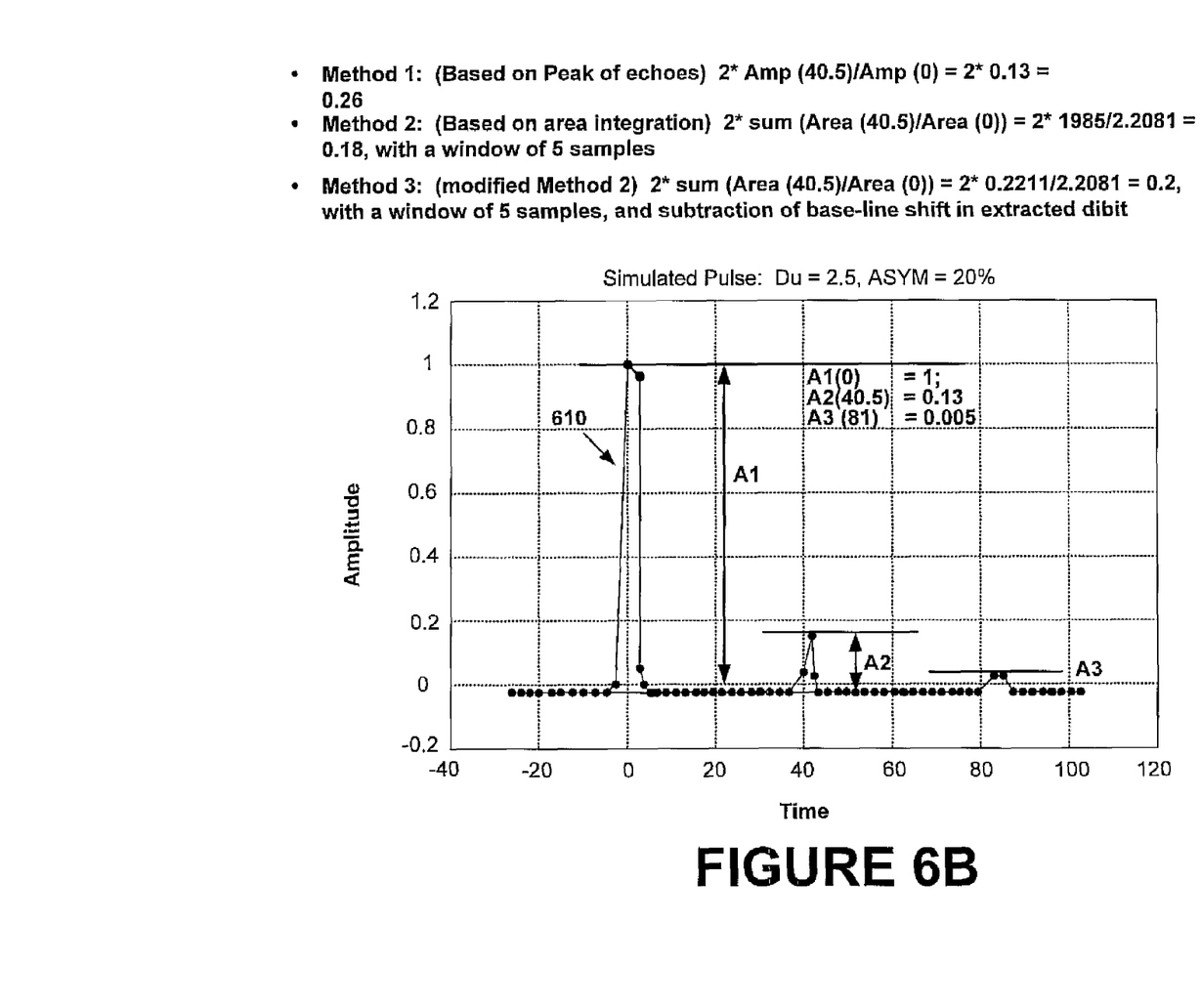
FIG. 6B shows a waveform that represents the read-back signal that corresponds to the synthetic waveform satisfying the constraints of a polynomial.

FIG. 6B shows a waveform 610 that represents the read-back signal that corresponds to the synthetic waveform satisfying the constraints of polynomial (1). In addition, FIG. 6B shows the results that are obtained from various methods for characterizing non-linearities of a read-back signal of a recording system. In FIG. 6B, three methods, Method 1, Method 2 and Method 3 are compared. Method 1 is a based on echo peak amplitudes. Method 2 is based on an integration scheme. Method 3 is based on an integration scheme and takes into account baseline shift due to AC coupling and existence of DC signal components. It should be appreciated that Method 3 corresponds to the embodiment of the present invention embodied in the algorithm of FIG. 3A.

Referring to FIG. 6B, because the synthetic waveform that was used was chosen to exhibit an asymmetry of 20%, the most accurate method for characterizing non-linearities should provide a value that characterizes the asymmetry of the read-back signal that is similar. Method 1 characterized the asymmetry as being 26%, Method 2 characterized the asymmetry as being 18% and Method 3 characterized the asymmetry as being 20%. Consequently, the embodiment of the present invention as represented by Method 3 is shown to perform better than conventional Methods 1 and 2.

Figure 6C:
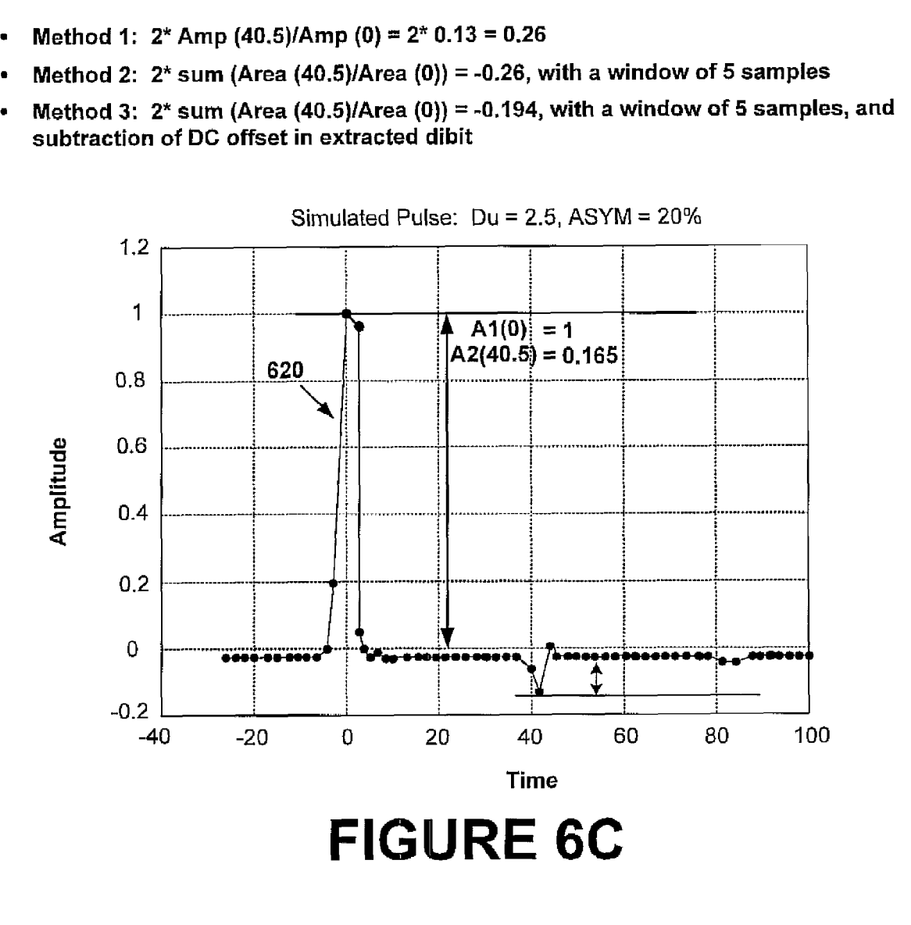
FIG. 6C shows a waveform that represents the read-back signal that corresponds to the synthetic waveform satisfying the constraints of a polynomial.

FIG. 6C shows a waveform 620 that represents the read-back signal that corresponds to the synthetic waveform satisfying the constraints of polynomial (1). In addition, FIG. 6C compares the results that are obtained from various methods for characterizing non-linearities of a read-back signal of a recording system. In FIG. 6C, the three methods compared in FIG. 6B, Method 1, Method 2 and Method 3 are again compared for negative non-linearity.

Referring to FIG. 6C, because the synthetic waveform that was used was chosen to exhibit an asymmetry of −20%, the most accurate method for characterizing non-linearities should provide a value that characterizes the asymmetry of the read-back signal that is similar. Method 1 characterized the asymmetry as being −26%, Method 2 characterized the asymmetry as being −26% and Method 3 characterized the asymmetry as being −19.4%. Consequently, the embodiment of the present invention as represented by Method 3 performs better than conventional Methods 1 and 2 (based on absolute values).

Figure 6D:
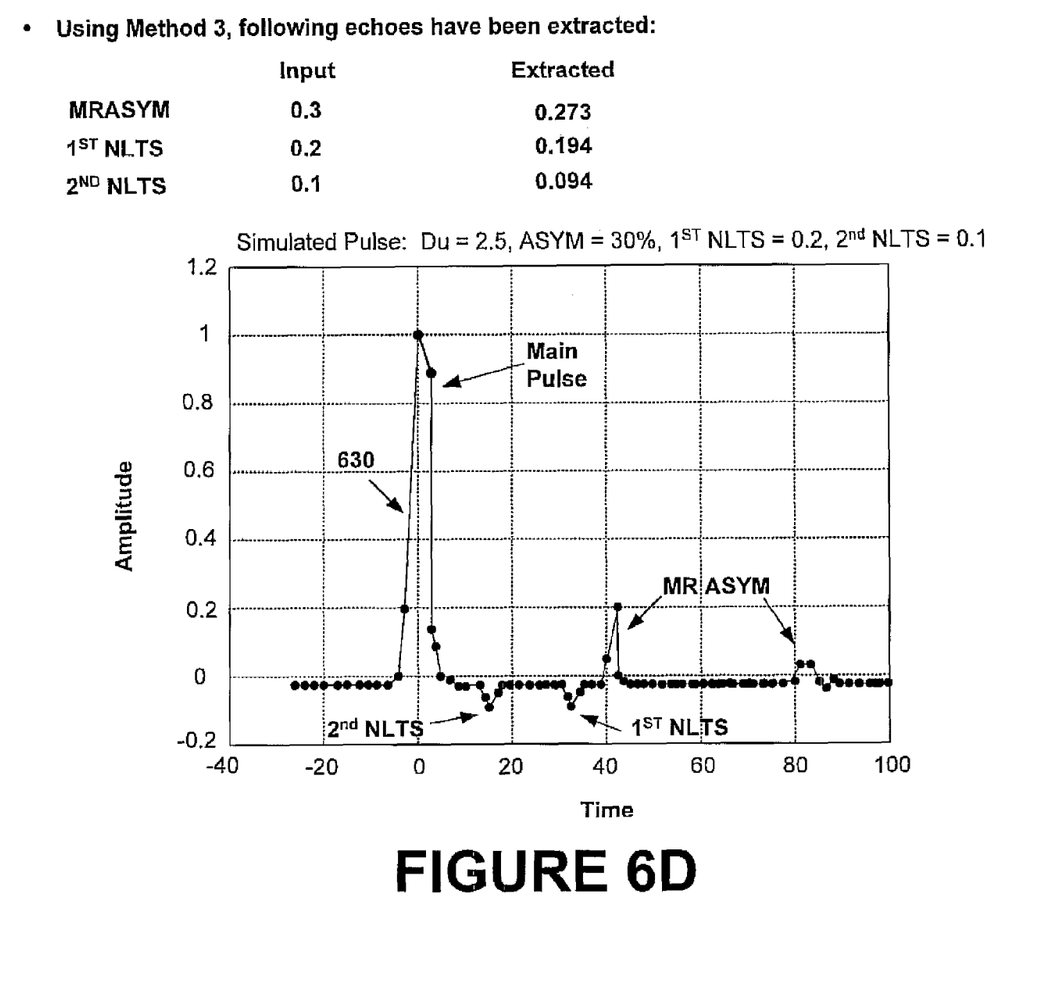
FIG. 6D shows a read-back signal that exhibits a multiplicity of non-linearities.

FIG. 6D shows a read-back signal that exhibits a multiplicity of non-linearities. In FIG. 6D, the read-back signal shows $1^{st}$ and $2^{nd}$ NLTS and MR ASYM non-linearities. Referring to FIG. 6D, it is demonstrated that Method 3 may be effectively used to characterize a multiplicity of non-linearities such as are exhibited by the read-back signal that is represented therein. For instance, for input non-linearities of 30% (MR SYM), 20% (1rst NLTS) and 10% ($2^{nd}$ NLTS) respectively, the non-linearities were characterized by Method 3 to be 27.3%, 19.4% and 9.4%.

Figure 7:
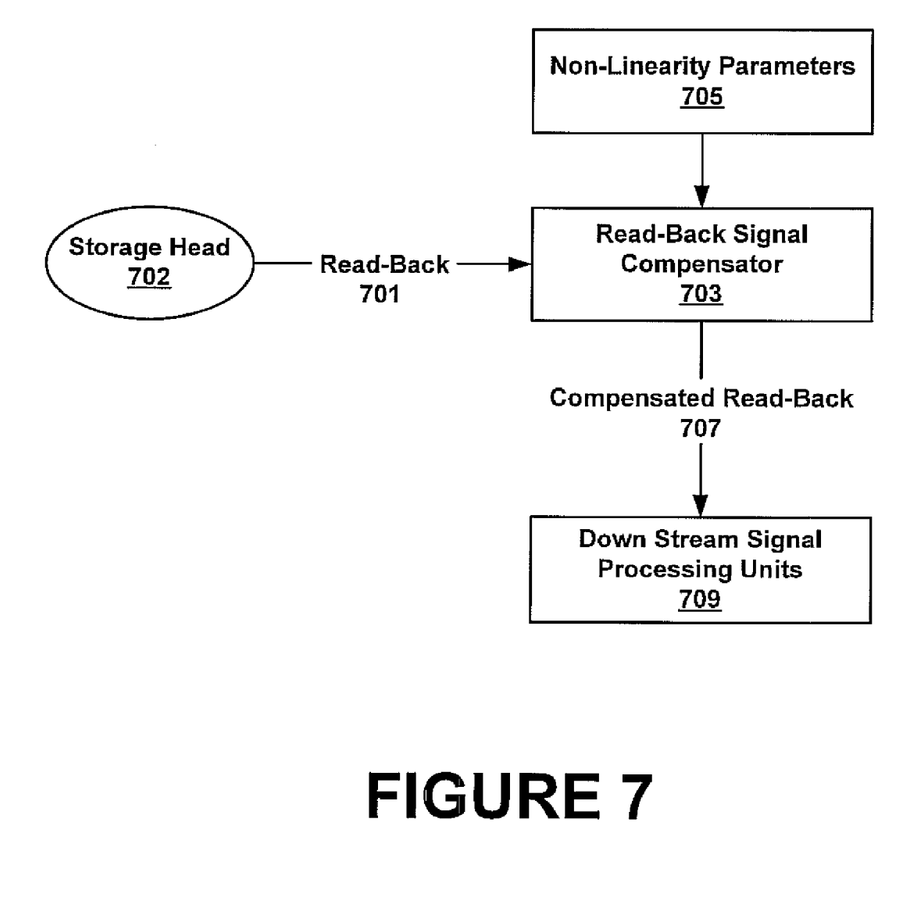
FIG. 7 illustrates a system using the parameters computed for non-linearities for compensation of a read-back signal.

FIG. 7 is a block diagram 700 of a read-back signal non-linearity compensation system according to one embodiment of the present invention. Referring to FIG. 7, a read-back signal 701 exhibiting non-linearities and output by a storage head 702 is input to a read-back compensator 703. Based upon non-linearity parameters 705 (such as may be obtained from system 105 of FIGS. 1 and 2) that are input to the read-back compensator 703, non-linearities in read-back signal 701 are compensated for. A compensated read-back signal 707 is output by read-back signal compensator 703 and is made available for downstream signal processing units 709.

With reference to exemplary embodiments thereof a method for automatically characterizing non-linearities of a read-back signal of a recording system is disclosed. The method includes using dibit extraction to obtain a read-back signal having a main pulse and a plurality of echoes where the read-back signal exhibits a baseline shift, integrating an area of the read-back signal under a first echo to obtain a first area where the integrating accounts for any baseline shift area within the first echo and where the first echo is associated with a first non-linearity, and, integrating an area of the read-back signal under the main pulse to obtain a second area where the integrating accounts for any baseline shift area within the main pulse. A first parameter is computed that characterizes the first non-linearity based on the first area and the second area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of automatically characterizing non-linearities of a read-back signal of a recording system, said method comprising:
   using dibit extraction to obtain a read-back signal having a main pulse and one or more echoes wherein said read-back signal comprises a baseline shift;
   integrating an area of said read-back signal under said one or more echoes to obtain a corresponding one or more areas wherein said integrating subtracts any baseline shift area within said one or more echoes and wherein said one or more echoes is associated with one or more non-linearities;
   integrating an area of said read-back signal under said main pulse to obtain another area wherein said integrating subtracts any baseline shift area within said main pulse; and
   based on said one or more areas and said another area under said main pulse, computing parameters characterizing said one or more non-linearities.

2. A method as described in claim 1 wherein said one or more non-linearities is an MR ASYM non-linearity.

3. A method as described in claim 2 wherein said one or more non-linearities is an OW non-linearity.

4. A method as described in claim 3 wherein said one or more non-linearities is an NLTS non-linearity.

5. A method as described in claim 1 wherein said parameters are computed by twice a value of said one or more areas divided by said area of said main pulse.

6. A method as described in claim 1 further comprising:
   obtaining read-back signals from said recording system; and
   using said parameters to reduce contributions of said one or more non-linearities within said read-back signals to produce compensated read-back signals.

7. A method as described in claim 1 wherein said recording head is a perpendicular recording head.

8. A method as described in claim 7 wherein said read-back signal is a perpendicular signal.

9. A system of automatically characterizing non-linearities of a read-back signal of a recording system, said method comprising:

a dibit extractor for obtaining a read-back signal having a main pulse and one or more echoes wherein said read-back signal comprises a baseline shift;
   an integrator for integrating an area of said read-back signal under said one or more echoes to obtain a corresponding one or more areas wherein said integrating subtracts any baseline shift area within said one or more echoes and wherein said one or more echoes is associated with one or more non-linearities;
   an integrator for integrating an area of said read-back signal under said main pulse to obtain another area and wherein said integrating subtracts any baseline shift area within said main pulse; and
   a parameter characterizer for computing parameters characterizing said one or more non-linearities based on said one or more areas and said another area under said main pulse.

10. A system as described in claim 9 wherein said one or more non-linearities is an MR ASYM non-linearity.

11. A system as described in claim 10 wherein said one or more non-linearities is an OW non-linearity.

12. A system as described in claim 11 wherein said one or more non-linearities is an NLTS non-linearity.

13. A system as described in claim 9 wherein said parameters are computed by twice a value of said one or more areas divided by said area of said main pulse.

14. A system as described in claim 9 further comprising a read-back signal compensator, said read-back signal compensator:
   obtaining read-back signals from said recording system; and
   using said parameters to reduce contributions of said one or more non-linearities within said read-back signals to produce compensated read-back signals.

15. A system as described in claim 9 wherein said recording head is a perpendicular recording head.

16. A system as described in claim 15 wherein said read-back signal is a perpendicular signal.

17. A method of automatically characterizing non-linearities of a read-back signal of a recording system, said method comprising:
   using dibit extraction to obtain a read-back signal having a main pulse and a plurality of echoes and wherein said read-back signal comprises a baseline shift;
   integrating an area of said read-back signal under a first echo of interest to obtain a first area wherein said integrating subtracts any baseline shift area within said first echo and wherein said first echo is associated with a first non-linearity;
   integrating an area of said read-back signal under a second echo of interest to obtain a second area wherein said integrating subtracts any baseline shift area within said second echo and wherein said second echo is associated with a second non-linearity;
   integrating an area of said read-back signal under a third echo of interest to obtain a third area wherein said integrating subtracts any baseline shift area within said third echo and wherein said third echo is associated with a third non-linearity;
   integrating an area of said read-back signal under said main pulse to obtain an area and wherein said integrating subtracts any baseline shift area within said main pulse; and
   based on said first, second, and third areas and said area under said main pulse, computing parameters characterizing said first, second, and third non-linearities.

18. A method as described in claim 17 wherein said first non-linearity is an MR ASYM non-linearity, said second non-linearity is an OW non-linearity and said third non-linearity is an NLTS non-linearity.

19. A method as described in claim 17 wherein said parameters are computed by twice a value of said first, second or third area divided by said area of said main pulse.

20. A method as described in claim 17 further comprising:
obtaining read-back signals from said recording system; and
using said parameters to reduce contributions of said first, second and third non-linearities within said read-back signals to produce compensated read-back signals.

21. A method of automatically characterizing non-linearities of a read-back signal of a recording system, said method comprising:
using dibit extraction to obtain a read-back signal having a main pulse and a plurality of echoes and wherein said read-back signal comprises a baseline shift;
integrating an area of said read-back signal under a first echo to obtain a first area wherein said integrating subtracts any baseline shift area within said first echo and wherein said first echo is associated with a first non-linearity;
integrating an area of said read-back signal under said main pulse to obtain a second area wherein said integrating subtracts any baseline shift area within said main pulse; and
based on said first area and said second area, computing a first parameter characterizing said first non-linearity.

22. A method as described in claim 21 further comprising:
obtaining read-back signals from said recording head; and
using said first parameter to reduce contributions of said first non-linearity within said read-back signals to produce compensated read-back signals.

23. A method as described in claim 21 further comprising:
integrating an area of said read-back signal under a second echo to obtain a third area wherein said integrating subtracts any baseline shift area within said second echo and wherein said second echo is associated with a second non-linearity; and
based on said third area and said second area, computing a second parameter characterizing said second non-linearity.

24. A system for automatically characterizing non-linearities of a read-back signal of a recording system, said method comprising:
a dibit extractor for performing dibit extraction to obtain a read-back signal having a main pulse and a plurality of echoes and wherein said read-back signal comprises a baseline shift;
an integrator for integrating an area of said read-back signal under a first echo to obtain a first area wherein said integrating subtracts any baseline shift area within said first echo and wherein said first echo is associated with a first non-linearity;
an integrator for integrating an area of said read-back signal under said main pulse to obtain a second area wherein said integrating subtracts any baseline shift area within said main pulse; and
a non-linearity characterizer for computing a first parameter characterizing said first non-linearity.

25. A system as described in claim 24 further comprising:
an integrator for integrating an area of said read-back signal under a second echo to obtain a third area wherein said integrating subtracts any baseline shift area within said second echo and wherein said second echo is associated with a second non-linearity; and
wherein said non-linearity characterizer is also for, based on said third area and said second area, computing a second parameter characterizing said second non-linearity and wherein said second parameter is computed by twice a value of said third area divided by said second area.

\* \* \* \* \*